United States Patent [19]

Takahashi

[11] 4,086,471
[45] Apr. 25, 1978

[54] PULSE TRAIN CONVERTER

[75] Inventor: Yukiharu Takahashi, Yokohama, Japan

[73] Assignee: Tokyo Shibaura Electric Co., Ltd., Kawasaki, Japan

[21] Appl. No.: 785,114

[22] Filed: Apr. 6, 1977

[30] Foreign Application Priority Data

Apr. 7, 1976 Japan .................................. 51-38896

[51] Int. Cl.² ............................................ H03K 21/36
[52] U.S. Cl. ......................... 235/92 DM; 235/92 CC; 235/92 TC; 235/92 R; 328/38
[58] Field of Search ......... 235/92 PL, 92 CC, 92 TC, 235/92 T, 92 DM, 92 MP; 328/38; 235/194

[56] References Cited

U.S. PATENT DOCUMENTS

| 3,832,640 | 8/1974 | Cederquist et al. | 328/38 |
| 3,867,614 | 2/1975 | White | 235/92 PL |
| 3,937,932 | 2/1976 | Ahlgren | 235/92 PL |

Primary Examiner—Joseph M. Thesz
Attorney, Agent, or Firm—Oblon, Fisher, Spivak, McClelland & Maier

[57] ABSTRACT

A pulse train converter converts a first pulse train into a second pulse train of a higher frequency. The pulse train converter comprises a pulse generator for generating pulses having a specified frequency, a frequency divider for dividing the output frequency of the pulse generator by $_2M/n$, where $n$ denotes an integer and M denotes the number of parts into which the time period of the pulses contained in the first pulse train is divided by the pulses contained in the second pulse train, a counter which is reset upon receipt of each pulse of the first pulse train and starts to count the output pulses from the frequency divider, and a register for storing the count of the counter upon receipt of each pulse of the first pulse train. The lower order $n$ bits of the output of the register are supplied to compensation signal generator circuit, and the remaining higher order bits are preset in a preset counter as a reference value. The preset counter produces pulses constituting the second pulse train, each time it receives from the pulse generator pulses the number of which is equal to the reference value. The compensation signal generator cumulates the lower order $n$ bits. Each time the value of the cumulated lower order bits reaches a specified value, it supplies a compensation signal to the preset counter, thereby to compensate the reference value.

5 Claims, 15 Drawing Figures

FIG. 4 PRIOR ART
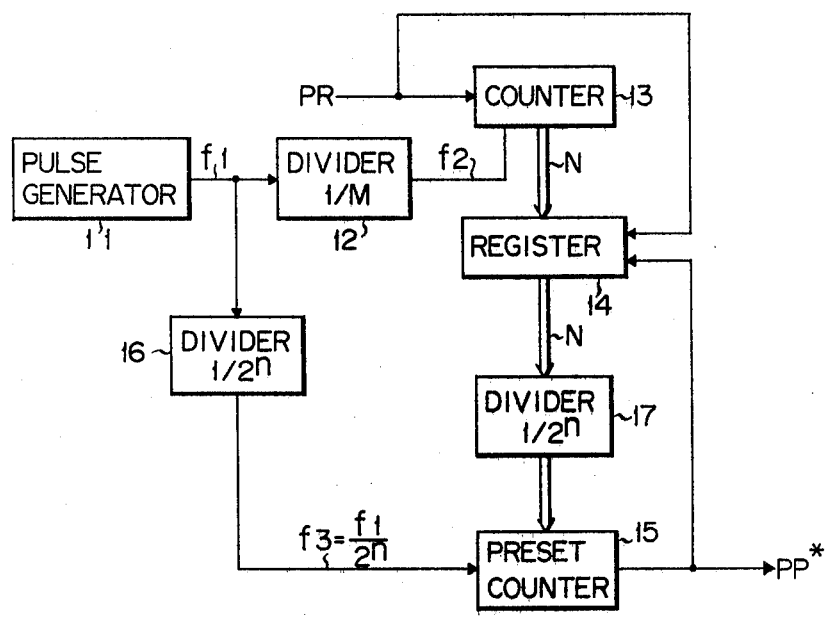
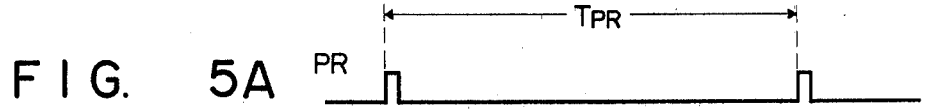
FIG. 5A
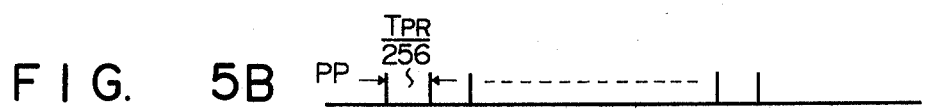
FIG. 5B
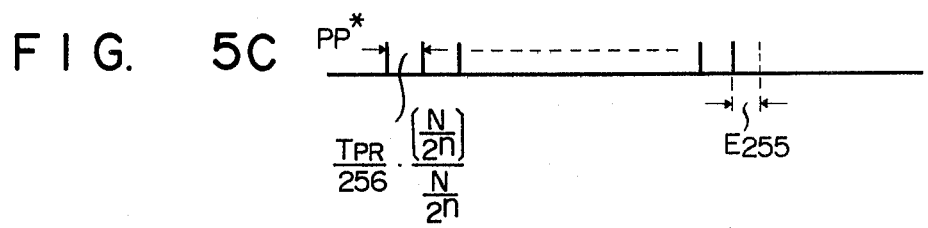
FIG. 5C $$T_{PP1} = \frac{T_{PR}}{256} \cdot \frac{NU}{N/2^n} \; ; \quad T_{PP2} = \frac{T_{PR}}{256} \cdot \frac{NU+1}{N/2^n}$$

$$\frac{N}{2^n} \equiv NU + \frac{NL}{2^n} \; ;$$

1 CYCLE PERIOD = $2^n \times T_{PP} = (2^n - NL)T_{PP1} + (NL)T_{PP2}$

PULSE TRAIN CONVERTER

BACKGROUND OF THE INVENTION

This invention relates to a pulse train converter for converting a first pulse train into a second pulse train of a higher frequency. More particularly, it relates to a pulse train converter which suitably serves to estimate the angle of rotation of a rotary shaft.

The pulse train converter according to this invention estimates effectively, in particular, the angle of rotation of the shaft of a gasoline engine. Thus an explanation will be made of the prior art device employed in combination with a gasoline engine.

The exhaust gas of gasoline engines is polluting the air and thus endangering our health and environment very alarmingly. The air pollution due to the exhaust gas of gasoline engines is now a serious social problem. Such air pollution is said to be checked appreciably if the gasoline engines are operated always under an optimum condition.

To operate each gasoline engine under an optimum condition the ignition should be so controlled as to take place at an appropriate time in accordance with the speed of rotation of the engine shaft. Various means are employed to determine the moment at which the ignition is to occur. Generally, a governor is used to measure the centrifugal force generated by the engine shaft rotation, or a diaphragm is used to measure the force by which the fuel is sucked into the engine. The force thus measured is utilized to shift the position where the ignition contacts are to meet. Thus, the ignition time is adjusted by shifting the ignition position. But the conventional ignition time point adjuster has a mechanically sliding section. The sliding section is liable to wearing, and is therefore likely to have the size of control part diminished. For this reason the conventional ignition time point adjuster cannot control accurately the ignition time point over a long time.

In an attempt to eliminate the drawback of the prior art device, thsre has been proposed such an ignition time point control device as shown in FIG. 1. This device has no contact. It comprises an optimum ignition angle determination (or decision) device 1, an engine ignition angle estimation device 2, a coincidence circuit 3 and an ignition circuit 4. An engine parameter is fed to the optimum ignition angle determination device 1 for determining the angle of rotation of the engine shaft at which the ignition is to be effected. Meanwhile, an engine reference pulse PR is fed to the engine ignition angle estimation device 2. The pulse PR is generated each time a specified point of the engine shaft passes by a specified fixed point.

Upon receipt of the engine parameter the optimum ignition angle determination device 1 produces a signal which denotes the optimum ignition angle. Similarly, upon receipt of the engine reference pulse PR the engine ignition angle estimation device 2 produces a signal which denotes the estimated engine ignition angle. These signals are supplied to the coincidence circuit 3. In response to these signals the coincidence circuit 3 may produce a coincidence signal, which is supplied to the ignition control circuit 4. Upon receipt of the coincidence signal the ignition control circuit 4 generates an output. The output of the circuit 4 is fed to an ignition plug (not shown).

In the optimum ignition angle determination device 1 there are stored the results of an engine test in the form of a numerical data table or numerical formular. Thus the device 1 determines the optimum ignition angle immediately, upon receipt of the engine parameter.

An engine ignition angle is estimated by the engine ignition angle estimation device 2 in the following manner. In a 4-cylinder engine, the upper dead point of each cylinder arrives each time the engine shaft rotates by 90°. The arrival of the upper dead point is detected by a sensor (not shown). Then the sensor produces an output, in response to which an engine reference pulse PR is generated as shown in FIG. 2A. Pulses PR are thus generated one after another as the engine shaft rotates. Thus obtained is a train 5 of pulses PR, which shall be called a first pulse train hereinafter. The first pulse train 5 is converted into such a second pulse train 6 as illustrated in FIG. 2B. The second pulse train 6 consists of a number of pulses PP which divide each pulse period of the first pulse train into parts, the number of which is denoted by M. For example, each pulse period is divided into 90 parts. In this case, the angle of rotation of the engine shaft can be estimated to 1°. This means that the angle of rotation of the engine shaft for a given time is estimated by counting the pulses PP. To simplify the explanation, hereinafter pulses PR will be called reference pulses or first train pulses, and pulses PP will be called dividing pulses or second train pulses. For the same reason, the engine ignition angle estimation device 2 will be called pulse train converter.

The conventional pulse train converter 2 has such a construction as shown in FIG. 3. Namely it comprises a pulse generator 11, a frequency divider 12, a counter 13, a register 14 and a preset counter 15. The pulse generator 11 produces pulses having a predetermined frequency $f_1$. The pulses are supplied to the frequency divider 12. The frequency divider 12 divides the frequency $f_1$ by M (i.e. divisor for dividing the pulse period of the first train pulses PR). Each pulse from the pulse generator 11 is thus divided into pulses having a frequency $f_2$. The pulses of frequency $f_2$ are supplied to the counter 13. Each time it receives a first train pulse PR (engine reference pulse), the counter is reset and start counting the pulses of frequency $f_2$. Similarly, the register 14 stores the count N of the counter 13 each time it receives a first train pulse PR. The contents (i.e. count N) of the register 14 are preset in the preset counter 15. To the preset counter 15 the pulses of frequency $f_1$ from the pulse generator 11 are supplied as subtraction pulses. That is, upon receipt of one pulse of frequency $f_1$ the present counter 15 has its preset value reduced by one. Each time its preset value becomes zero, the preset counter 15 produces a second train pulse PP, which is also supplied to the register 14. In response to the second train pulse PP the register 14 supplies its contents (i.e. count N) to the preset counter 15. No matter how much the pulse period $T_{PR}$ of the first train pulse PR varies, second train pulses PP having a pulse period of $T_{PR}/M$, the number of which is M, are produced during the pulse period of $T_{PR}$.

However, the pulse train converter of FIG. 3 is faced with the following problems. While the shaft of an automobile engine is rotating at the highest speed possible, for example at 6000 r.p.m., the pulse period $T_{PR}$ of the first train pulses PR is about 2.5 ms. Let the pulse period of the second train pulses PP be denoted as $T_{PP}$. Then, if the angle of rotation of the engine shaft can be measured to the degree of $\Delta T$, the following equation will be established:

$$f_1 = \frac{M}{\Delta T}, \quad T_{PR} = N\Delta T$$

$$f_2 = \frac{1}{\Delta T}, \quad T_{PP} = N \cdot \frac{\Delta T}{M} = \frac{T_{PR}}{M} \quad (4)$$

These equations teach that if $T_{PR}$, M and T are to be 2.5 ms, 90 and 10µS, respectively, $f_1$ has to be 9MHz. The electronic circuits generally used for controlling the automobile engines are constituted chiefly by MOS transistors. The MOS transistors should therefore withstand a temperature variation from −40° C to 125° C and the operated by power source voltage $T_{BAT}$ of a 6 to 30V. Under such conditions the MOS transistors will fail to operate if their input frequency is as high as 9MHz.

To solve the above-mentioned problem, such a pulse train converter as shown in FIG. 4 has been proposed. This pulse train converter differs from that of FIG. 3 merely in that it is provided with a frequency divider 16 and a divider 17. The frequency divider 16 divides the output frequency $f_1$ of the pulse generator 11 by $2^n$, where n denotes an integer. It produces pulses having a frequency of $f_3 (= f_1/2^n)$. The output pulses of the frequency divider 16 are supplied to the preset counter 15 as subtraction signals. On the other hand, the divider 17 divides the count N stored in the register 14 also by $2^n$, thereby obtaining $N/2^n$. The value of $N/2^n$ is preset in the preset counter 15.

The pulse train converter shown in FIG. 4 can operate basically in the same manner as the pulse train converter of FIG. 3, and yet the input frequency of the preset counter 15 can be lowered sufficiently. But the pulse period $T_{PP}*$ of second train pulses PP* from the preset counter 15 is shorter than the true pulse period $T_{PP}$ of second train pulses PP, as shown in FIGS. 5B and 5C. This results in an erroneous estimation of the angle of rotation of the engine shaft. To put it more precisely, generally the value of $N/2^n$ cannot be an integer; it usually consists of an integral portion and a decimal fraction. Its integral portion is preset in the preset counter 15, but its decimal fraction cannot be preset. If $M = 256$ and $\Delta T = 25\mu s$, the pulse period $T_{PP}$ of second train pulses shown in FIG. 3 comes to have the true value of $T_{PR}/256$ as shown in FIG. 5B. In this case, however, the pulse period $T_{PP}*$ of second train pulses PP* obtained by the pulse train converter of FIG. 4 comes to have a false value which is smaller than the true value and which is represented as follows:

$$T_{PP*} = \frac{T_{PR}}{256} \times \frac{[\frac{N}{2^n}]}{\frac{N}{2^n}}$$

Consequently, if the pulse train converter of FIG. 4 is employed, the difference between the true and false values of the pulse period of second train pulses will be cumulated. An error will therefore be inevitable in estimating the angle of rotation of the engine shaft. For instance, if $M = 255$, the error $E_{255}$ amounts to $2^n \times 25\mu s$ in some cases. Apparently, the angle of rotation of the engine shaft cannot be estimated accurately.

Accordingly the object of this invention is to provide a pulse train converter which can convert a first pulse train into a second pulse train the pulses of which have substantially the same pulse period and divide the pulse period of the first train pulses into M parts (M denotes an integer), and in which the input frequency to the main part can be kept relatively low.

SUMMARY OF THE INVENTION

The pulse train converter of the invention converts a first pulse train into a second pulse train having a higher frequency. It comprises a pulse generator for generating pulses having a specified frequency; a frequency divider for dividing the output frequency of the pulse generator by $M/2^n$, where n denotes an integer and M denotes the number of parts into which the time period of the pulses contained in the first pulse train is divided by the pulses contained in the second pulse train; a counter which is reset upon receipt of each pulse of the first pulse train and starts to count the output pulses supplied from the frequency divider; a register for storing the count of the counter upon receipt of each pulse of the first pulse train; a pulse delivering means which receives only the higher order bits except lower order n bits of the count stored in the register as a reference value and which delivers pulses constituting the second pulse train each time the number of pulses it receives from the pulse generator equals the reference value; and a compensation means for compensating the reference value in accordance with the count value represented by the lower order n bits of the count supplied from the register.

According to the invention, pulses which constitute a second pulse train and which divide the period of each pulse of a first pulse train into M parts at substantially regular intervals can be generated, while the time point at which each pulse of the second pulse train is generated is controlled. For this reason, if applied to estimate the angle of rotation of a rotary shaft, the pulse train converter of this invention can estimate the angle more accurately than the prior art pulse train converters. In addition, it is possible with the pulse train converter according to this invention to keep low the input frequency to the main part.

BRIEF DESCRIPTION OF THE DRAWINGS

FIG. 4 is a block circuit diagram of another conventional pulse train converter;

FIGS. 5A, 5B and 5C show the waveform of a first pulse train, the waveform of a second pulse train obtained by the pulse train converter of FIG. 3, and the waveform of a second pulse train obtained by the pulse train converter of FIG. 4, respectively.

DETAILED DESCRIPTION OF THE PREFERRED EMBODIMENTS

Figure 1:
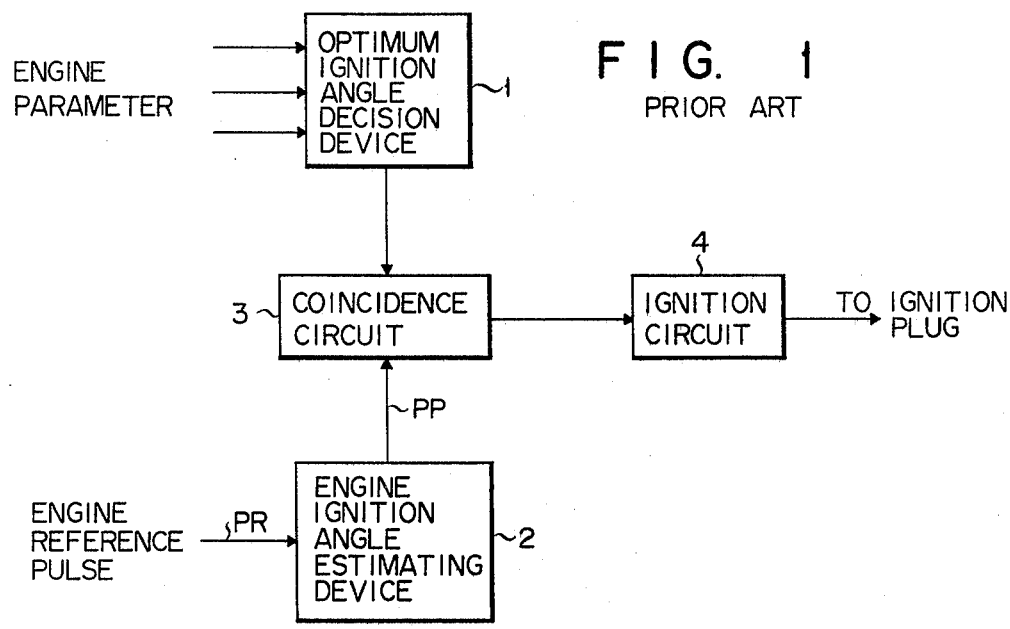
FIG. 1 is a block diagram of contact-less ignition control system for gasoline engines.
Figure 2A:
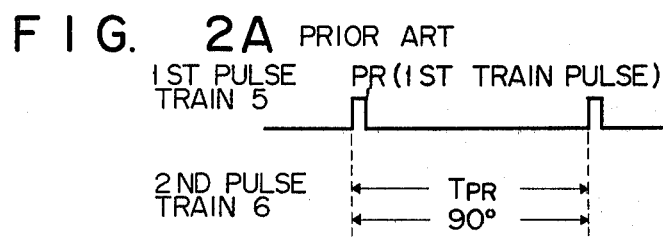
FIGS. 2A and 2B show input and output waveforms of the engine ignition angle estimation device (or pulse train converter) shown in FIG. 1.
Figure 2B:
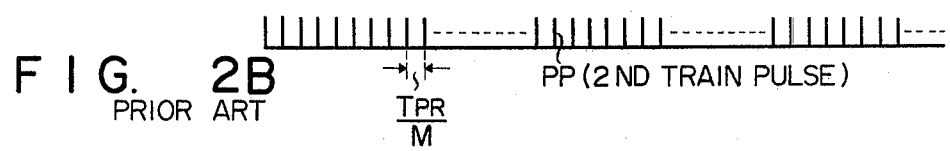
Figure 3:
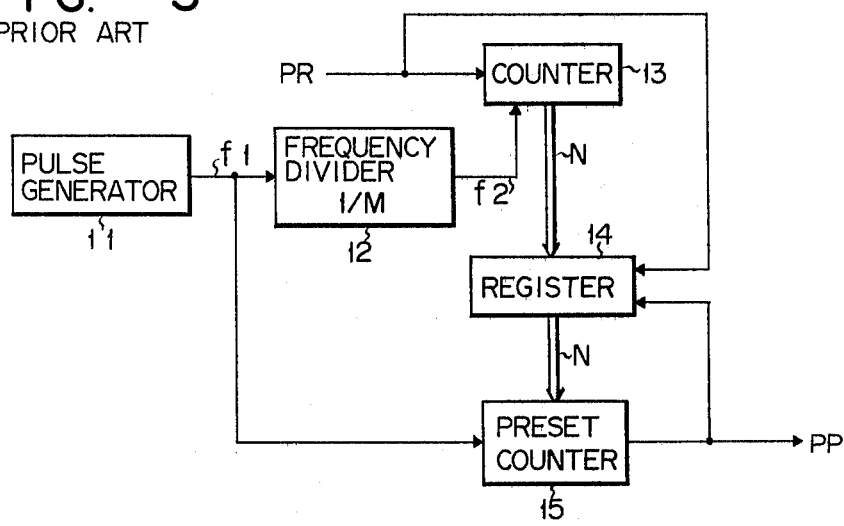
FIG. 3 is a block circuit diagram of a conventional pulse train converter.
Figure 6:
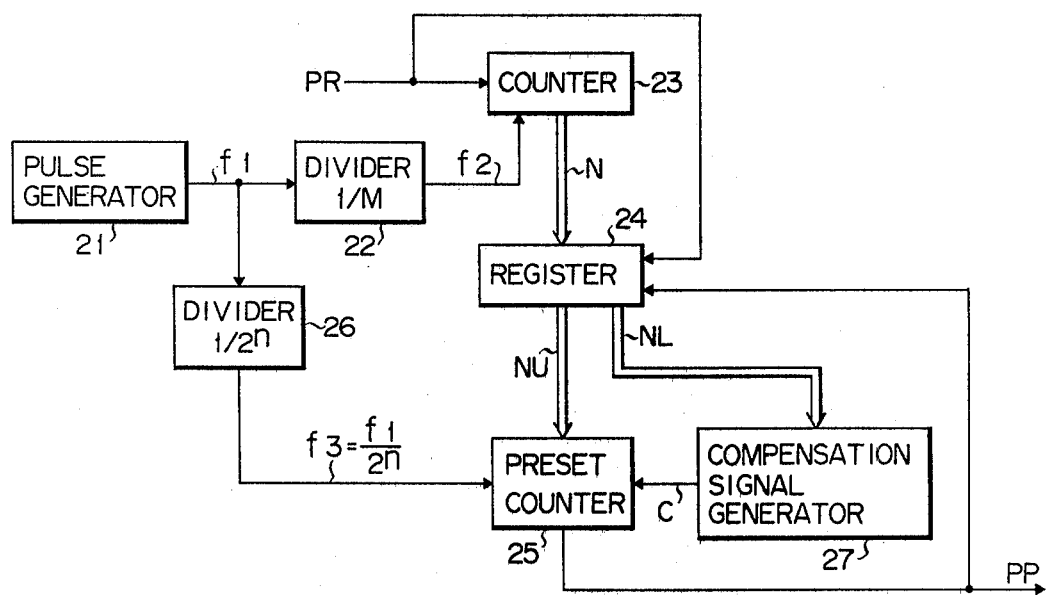
FIG. 6 is a block circuit diagram of one embodiment of the present invention.

In the pulse train converter shown in FIG. 6, a pulse generator 21 produces pulses having a specified frequency $f_1$. The output frequency $f_1$ of the pulse generator 21 is divided by a frequency divider 22 by M into a frequency $f_2$. The pulses from the frequency divider 22, now having the frequency $f_2$, are supplied to a counter 23. Each time it receives one pulse PR of the first pulse train, the counter is reset to start counting the pulses of frequency $f_2$. The pulses PR are supplied also to a register 24. Upon receipt of each pulse PR the register 24 stores the count N of the counter 23.

In the meantime, the output pulses of the pulse generator 21 are supplied also to a frequency divider 26. The frequency divider 26 divides the frequency $f_1$ into a frequency $f_3$ by $2^n$, where $n$ denotes an integer. The pulses from the frequency divider 26, now having frequency $f_3$, are fed to a preset counter as substraction signals. The preset counter 25 receives from the register 24 a count NU which represents the higher order bits except lower order $n$ bits of the count stored in the register 24 as a reference value. In place of count NU there may be preset in the preset counter 25 a compensated count (NU+1) delivered from a compensation signal generator 27 when a compensation signal C is generated.

Figure 9:
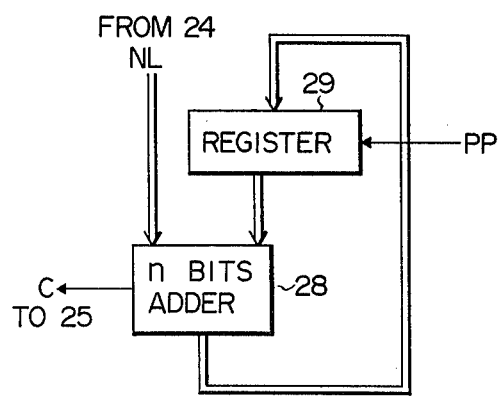
FIG. 9 is a block circuit diagram of the compensation signal generator shown in FIGS. 6 and 7.

As shown in FIG. 9, the compensation signal generator 27 comprises, for example, an $n$-bit adder 28 and a register 29. The $n$-bit adder receives a count NL representing the lower order $n$ bits stored in the register 24, each time the register 24 receives one first train pulse PR. It adds up these lower order $n$ bits. The register 29 stores the output of the $n$-bit adder 28, and feeds its contents back to the $n$-bit adder 28 each time it receives an output pulse PP of the present counter 25. The $n$-bit adder 28 cumulates counts NL's until its contents overflow. Upon each overflow of contents the $n$-bit adder 28 generates a compensation signal C. In response to the compensation signal C, the preset counter 25 changes the preset value (i.e. reference value) into a compensated reference value (NU+1). For this reason, while preset at the first reference value NU, the present counter 25 delivers a pulse PP each time the first reference value NU (i.e. the higher order bits stored in the register 24) equals the number of the pulses it has received from the frequency divider 26. While preset at the second reference value (NU+1), the present counter 25 delivers a pulse PP each time the preset value (NU+1) coincides with the numbrr of the pulses it has received from the frequency divider 26. The pulse PP is supplied to, for instance, the ignition control device of an engine and simultaneously to the register 24 as a signal to transfer the stored count of the register 24 to both the preset counter 25 and the $n$-bit counter 28.

It will now be explained in detail how the pulse train converter of FIG. 6 operates. Suppose the pulse period of the pulses having frequency $f_1$ is 25$\mu$s and M is 256. Then, as evident from FIG. 4, in order to lower the output frequency $f_1$ of the pulse generator 21 to $(1/2^n) \cdot f_1$ it is necessary to diminish the count N stored in the register 24 to $(N/2^n)$ and preset the reduced count $(N/2^n)$ in the preset counter 25. In the present invention, the count NU (i.e. contents of higher order bits except lower order $n$ bits stored in the register 24) is preset in the preset counter 25, and the count NL (i.e. lower order $n$ bits stored in the register 24) is supplied to the compensation signal generator 27. The counts NL's are cumulated in the compensation signal generator 27 until a compensation signal C is generated. The signal C serves to compensate the count NU (i.e. reference value) in the preset counter 25, thereby to eliminate the drawbacks of such a conventional pulse train converter as shown in FIG. 4.

Let $T_{PR}$, N, $T_{PP}$, $T_{PP1}$ and $T_{PP2}$ denote respectively the pulse period of each first train pulse PR, the count of the counter 23 during $T_{PR}$, the pulse period of second train pulses PP which divide $T_{PR}$ accurately into M (=256) parts, the pulse period of pulses PP which divide $T_{PR}$ by $[N/2^n]$ and the pulse period of pulses PP which divide $T_{PR}$ by $[N/2^n] + 1$. Then the following three equations will be established:

$$T_{PP} = \frac{T_{PR}}{256} = \frac{25 \times 2^n}{256} \times \frac{N}{2^n} \, (\mu s) \qquad (2)$$

$$T_{PP1} = \frac{25 \times 2^n}{256} \times [\frac{N}{2^n}] = \frac{25 \times 2^n}{256} \times NU \, (\mu s) \qquad (3)$$

$$T_{PP2} = \frac{25 \times 2^n}{256} \times ([\frac{N}{2^n}] + 1)$$

$$= \frac{25 \times 2^n}{256} \times (NU + 1) \, (\mu s) \qquad (4)$$

Figure 11A:
FIGS. 11A and 11B show the waveforms of a second pulse train obtained by the pulse train converter shown in FIG. 6.
Figure 11B:
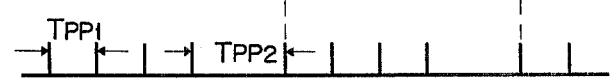

To prevent a second train pulse PP* (FIG. 5C) position from being eroneously positioned as shown in FIG. 5C as it inevitably happens in the pulse train converter of FIG. 4, the following measures may be taken. Namely, as shown in FIGS. 11A and 11B, $2^n \times T_{PP}$ is considered one cycle for compensating the reference value. FIG. 11A shows an ideal second pulse train; pulses PP have been generated at desired intervals. In practice, such an ideal second pulse train cannot be obtained in FIG. 6. Second train pulses PP are generated at shorter intervals as shown in FIG. 11B. In order to compensate the difference between $(T_{PR}/256)$ and $T_{PP1}$, a correction should be conducted. Such correction is conducted merely by dividing the cycle (i.e. $2^n \times T_{PP}$) by NU and NU + 1 according to the count NL (i.e. the lower order $n$ bits stored in the register 24). That is:

$$\text{One cycle period} = 2^n \times T_{PP} = A \times T_{PP1} + B \times T_{PP2} \qquad (5)$$

In equation (5), A = $(2^n - NL)$, B = NL. Suppose $n = 2$ and NL = 1. Then the error occurring from the difference between ideal $T_{PP}$(FIG. 11A) and $T_{PP1}$ (FIG. 11B) can be made zero only if each cycle period is divided by $T_{PP1}$ three times and by $T_{PP2}$ one time. In effecting this difference compensation, $(N/2^n)$ is partitioned into an integral portion $[N/2^n]$ and a decimal fraction $\Delta N$. Thus:

$$\frac{N}{2^n} \equiv [\frac{N}{2^n}] = \Delta N \qquad (6)$$

If $$NU \equiv [\frac{N}{2^n}], \, NL \equiv N \times 2^n = (\frac{N}{2^n} - [\frac{N}{2^n}]) \times 2^n$$

in equation (6), the following equation will be established.

$$\frac{N}{2^n} = NU + NL \times 2^n \text{(where, } 0 \leq NL \leq 2^n - 1) \quad (7)$$

In case where N and n denote 12 bits and 4 bits, respectively, NU represents 8 bits, and NL 4 bits. In other words, in FIG. 6, if one cycle period is divided $(2^n - NL)$ times by NU and NL times by (NU+1) according to the count NL (i.e. the lower order n bits stored in the register 24), the second train pulse position error occurring from the difference between ideal $T_{PP}$ (FIG. 11A) and actual $T_{PP}$ (FIG. 11B) becomes zero for every cycle period of compensation. In this case, a compensation signal C from the compensation signal generator 27 determines the time at which each cyle period is divided by (NU+1).

The following table shows the value of count NL supplied to the compensation signal generator 27 and explains when a compensation signal C is generated by the generator 27.

Table 1

| (n = 3) PP | | NL 01345567 |
|---|---|---|
| 0 | C = | 0 0 0 0 0 0 0 0 |
| 1 | | 0 0 0 0 1 1 1 1 |
| 2 | | 0 0 0 1 0 0 1 1 |
| 3 | | 0 0 1 0 1 1 1 1 |
| 4 | | 0 0 0 0 0 1 0 1 |
| 5 | | 0 0 0 1 1 0 1 1 |
| 6 | | 0 0 0 0 0 1 1 1 |
| 7 | | 0 1 1 0 1 1 1 1 |

Table 1 teaches that in case NL = 2 the dividing of one cycle period is completed by dividing the cycle period by NU six times and by (NU+1) two times. In this way the preset counter 25 can deliver the second train pulses PP which divide the pulse period $T_{PR}$ of the first train pulses PR into parts, the number of which is M, without cumulating the difference between each ideal $T_{PP}$ and each actual $T_{PP}$. It is therefore possible to keep sufficiently low the input frequency to the main part of the pulse train converter shown in FIG. 6.

Figure 10:
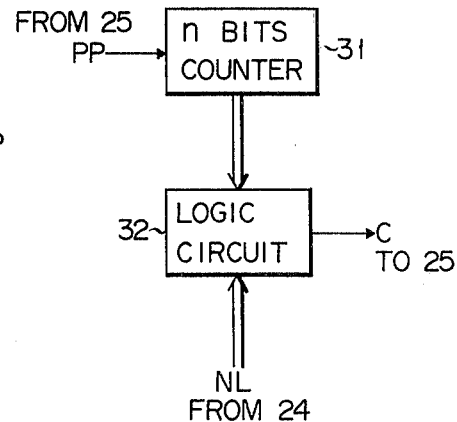
FIG. 10 is a block circuit diagarm of another type of the compensation signal generator.

The compensation signal generator 27 may be constructed as shown in FIG. 10. That is, it may be constituted by an n-bit counter 31 and a logic circuit 32. The n-bit counter 31 counts the second train pulses PP from the present counter 25 for the predetermined cycle period (see FIG. 11B). Its count CNT is fed to the logic circuit 32. To the logic circuit 32 the count NL (see FIG. 6) is supplied from the register 24. When the count CNT and the count NL come to have a predetermined relationship, the logic circuit produces a compensation signal C and feeds the same to the preset counter 25. The following table shows the relationship between CNT and NL and explains when a compensation signal C is generated by the compensation signal generator 27 of FIG. 10.

Table 2

| (n = 3) PP | CNT | | NL 01234567 |
|---|---|---|---|
| 0 | 000 | C = | 0 0 0 0 1 1 1 1 |
| 1 | 001 | | 0 0 1 1 0 0 1 1 |
| 2 | 010 | | 0 0 0 0 1 1 1 1 |
| 3 | 011 | | 0 1 0 1 0 1 0 1 |
| 4 | 100 | | 0 0 0 0 1 1 1 1 |
| 5 | 101 | | 0 0 1 1 0 0 1 1 |
| 6 | 110 | | 0 0 0 0 1 1 1 1 |

Table 2-continued

| (n = 3) PP | CNT | NL 01234567 |
|---|---|---|
| 7 | 111 | 0 0 0 0 0 0 0 0 |

Figure 8:
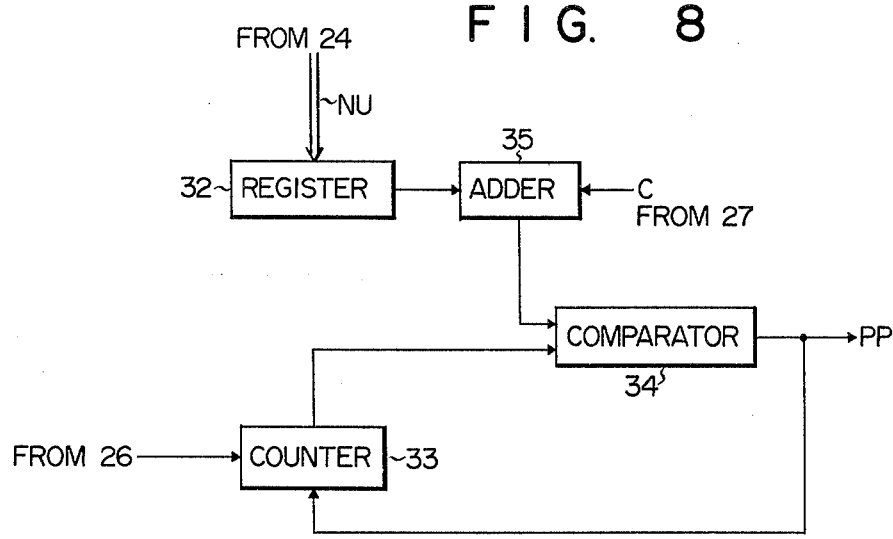
FIG. 8 is a block circuit diagram of one example of means for delivering a second pulse train.

The preset counter 25 shown in FIG. 6 may have such a structure as shown in FIG. 8. Namely it may be constituted by a register 32, a counter 33, a comparator 34 and an adder 35. The register 32 stores the output of the register 24, i.e. count NU, while the counter 33 counts the output pulses of the frequency divider 26. Both the output of the register 32 and the output of the counter 33 are supplied to the comparator 34. Upon detecting the coincidence between these inputs, the comparator 34 produces a second train pulse PP. The second train pulses PP are fed back to the counter 33. Each time it receives a second train pulses PP, the counter 33 is reset and starts counting new output pulses of the frequency divider 26. In the meantime, the adder 35 receives the count NU from the register 32. Further, the adder 35 is adapted to receive compensation signals C from the compensation signal generator 27. Each time it receives a compensation signal C, it adds "1" to the contents of the register 32, i.e. count UN.

Figure 7:
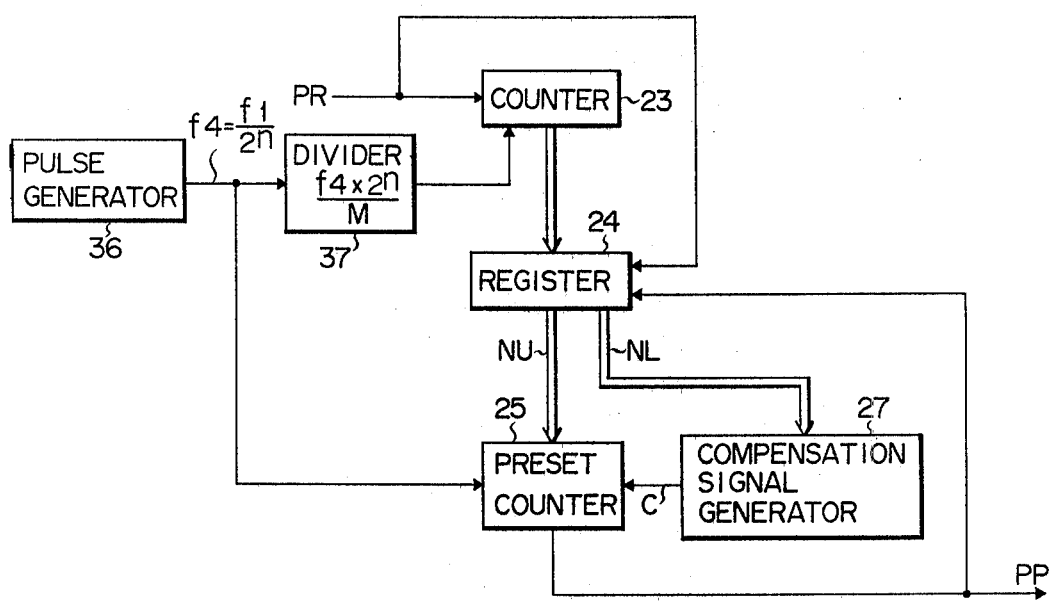
FIG. 7 is a block circuit diagram of another embodiment of the present invention.

The pulse train converter of FIG. 6 may be modified as illustrated in FIG. 7. In this embodiment, a pulse generator 36 generates pulses of a frequency of $(1/2^n) \cdot f_1$. These pulses are supplied to a frequency divider 37. The frequency divider 37 divides the output frequency of the pulse generator by $(M/2^n)$, where n denotes an integer. The pulses are supplied from the frequency divider 37 to a counter 23. Meanwhile, the pulses of $(f_1/2^n)$ are supplied from the pulse generator 36 to a present counter 25. There are further provided a register 24 and a compensation signal generator 27. The counter 23, register 24, preset counter 25 and compensation signal generator 27 are identical with those shown in FIG. 6 which bear the same reference numeeals. They are connected to one another and operate in the same manner as the pulse train converter shown in FIG. 6.

In the embodiment of FIG. 7, the output frequency of the pulse generator 36 is much lower than that of the pulse generator 21 shown in FIG. 6. For this reason, this embodiment can be constituted chiefly by MOS transistors. Thus the pulse train converter can be made into an LSI device.

What is claimed is:

1. A pulse train converter for converting a first pulse train into a second pulse train having a frequency higher than that of the first pulse train, comprising:
a pulse generator for generating pulses having a specified frequency;
a frequency divider for dividing the output frequency of the pulse generator by $(M/2^n)$, where n denotes an integer and M denotes the number of parts into which the time period of the pulses contained in said first pulse train is divided by the pulses contained in said second pulse train;
a counter which is reset upon receipt of each pulse of said first pulse train and starts to count the output pulses supplied from said frequency divider,
a register for storing the count of said counter upon receipt of each pulse of said first pulse train;
a pulse delivering means which receives only the remaining higher order bits except lower order n bits of the count stored in said register as a reference value and which delivers pulses constituting said second pulse train each time the number of pulses it receives from said pulse generator equals the reference value; and a compensation means for compensating said reference value in accordance with the count value represented by said lower order $n$ bits supplied from said register.

2. The pulse train converter according to claim 1, wherein said compensation means includes an $n$-bit adder which cumulates said lower order $n$ bits supplied from said register and which supplies a compensation signal for compensating said reference value to said pulse delivering means each time the cumulated count reaches a predetermined value.

3. The pulse train converter according to claim 1, wherein said compensation means includes an $n$-bit counter which counts the output pulses of said pulse delivering means and a logic circuit which receives the output of said $n$-bit counter and said lower order $n$ bits supplied from said register and which supplies a compensation signal for compensating said reference value to said pulse delivering means each time the output of said $n$-bit counter has a predetermined relationship with said lower order $n$ bits supplied from said register.

4. The pulse train converter according to claim 1, wherein said pulse delivering means is constituted by a preset counter.

5. A pulse train converter for converting a first pulse train into a second pulse train having a frequency higher than that of the first pulse train, comprising:
a pulse generator for generating pulses having a specified frequency;
a first frequency divider for dividing the output frequency of said pulse generator by M, where M denotes the number of parts into which the time period of the pulses contained in said first pulse train is divided by the pulses contained in said second pulse train;
a counter which receives the pulses of said first pulse train and the output pulses from said first frequency divider and which is reset upon receipt of each pulse of said first pulse train and starts to count the output pulses supplied from said first frequency divider;
a register for storing the count of said counter upon receipt of each pulse of said first pulse train;
a second frequency divider for dividing the output frequency of said pulse generator by $2^n$, where $n$ denotes an integer;
a pulse delivering means which receives only the higher order bits except lower order $n$ bits of the count stored in said register as a reference value and which delivers pulses constituting said second pulse train each time the number of pulses it receives from said second frequency divider equals said reference value; and
a compensation means for compensating said reference value in accordance with the count value represented by the lower order $n$ bits supplied from said register.

* * * * *